(12) United States Patent
Nordquist (10) Patent No.: US 8,081,184 B1
(45) Date of Patent: Dec. 20, 2011

(54) PIXEL SHADER PROGRAM THREAD ASSEMBLY

(75) Inventor: Bryon S. Nordquist, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 459 days.

(21) Appl. No.: 11/381,987

(22) Filed: May 5, 2006

(51) Int. Cl.
*G06T 15/50* (2011.01)

(52) U.S. Cl. ........ 345/426; 345/428; 345/581; 345/582; 345/520; 345/501; 345/503; 345/505; 345/506; 345/536; 345/545; 711/6; 711/100; 711/113; 711/125; 711/202

(58) Field of Classification Search .......... 345/418, 345/419, 426, 428, 581–582, 520, 501–503, 345/505–506, 536, 545, 552; 711/6, 100, 711/113, 125, 202, 203
See application file for complete search history.

(56) References Cited

U.S. PATENT DOCUMENTS

| | | | | |
|---|---|---|---|---|
| 5,969,726 A * | 10/1999 | Rentschler et al. | ............ | 345/506 |
| 6,025,853 A * | 2/2000 | Baldwin | ............ | 345/506 |
| 6,205,501 B1 * | 3/2001 | Brief et al. | ............ | 710/100 |
| 6,320,523 B1 * | 11/2001 | York et al. | ............ | 341/106 |
| 6,630,935 B1 * | 10/2003 | Taylor et al. | ............ | 345/522 |
| 6,769,047 B2 * | 7/2004 | Kurupati | ............ | 711/5 |
| 6,819,324 B2 * | 11/2004 | Emberling | ............ | 345/540 |
| 6,825,843 B2 * | 11/2004 | Allen et al. | ............ | 345/522 |
| 6,885,384 B2 * | 4/2005 | Deering et al. | ............ | 345/613 |
| 6,897,871 B1 * | 5/2005 | Morein et al. | ............ | 345/501 |
| 6,943,804 B2 * | 9/2005 | Alcorn et al. | ............ | 345/582 |
| 6,947,047 B1 * | 9/2005 | Moy et al. | ............ | 345/501 |
| 7,038,685 B1 * | 5/2006 | Lindholm | ............ | 345/501 |
| 7,053,893 B1 * | 5/2006 | Molnar et al. | ............ | 345/426 |
| 2002/0065966 A1 * | 5/2002 | Brief | ............ | 710/100 |
| 2003/0028844 A1 * | 2/2003 | Coombs | ............ | 714/796 |
| 2004/0160446 A1 * | 8/2004 | Gosalia et al. | ............ | 345/503 |
| 2004/0263519 A1 * | 12/2004 | Andrews et al. | ............ | 345/502 |
| 2005/0050305 A1 * | 3/2005 | Kissell | ............ | 712/220 |
| 2005/0093872 A1 * | 5/2005 | Paltashev et al. | ............ | 345/563 |
| 2005/0093873 A1 * | 5/2005 | Paltashev et al. | ............ | 345/581 |
| 2005/0219253 A1 * | 10/2005 | Piazza et al. | ............ | 345/557 |
| 2005/0275657 A1 * | 12/2005 | Hutchins et al. | ............ | 345/506 |
| 2006/0007234 A1 * | 1/2006 | Hutchins et al. | ............ | 345/506 |
| 2006/0020772 A1 * | 1/2006 | Hussain | ............ | 712/210 |
| 2006/0053189 A1 * | 3/2006 | Mantor | ............ | 708/490 |
| 2007/0103476 A1 * | 5/2007 | Huang et al. | ............ | 345/522 |

OTHER PUBLICATIONS

Eggers, et al., "Simultaneous Multithreading: A Platform for Next-Generation Processors," IEEE Micro, vol. 17, No. 5, pp. 12-19, Sep./Oct. 1997.

* cited by examiner

*Primary Examiner* — Andrew Wang
*Assistant Examiner* — Abderrahim Merouan
(74) *Attorney, Agent, or Firm* — Patterson & Sheridan, LLP (57) ABSTRACT

Systems and methods for assembling pixel shader program threads for execution based on resource limitations of a multithreaded processor may improve processing throughput. Pixels to be processed by the pixel shader program are assembled into a launch group for processing by the multithreaded processor as multiple shader program threads. The pixels are assembled based on parameter storage resource limitations of the multithreaded processor so that common parameters shared by multiple pixels are not stored separately for each pixel. Therefore, the limited parameter storage resources are efficiently used, allowing more shader program threads to execute simultaneously.

15 Claims, 8 Drawing Sheets

PIXEL SHADER PROGRAM THREAD ASSEMBLY

BACKGROUND OF THE INVENTION

1. Field of the Invention

Embodiments of the present invention generally relate to instruction execution for multithreaded processing and, more specifically, to assembling pixel shader program threads for execution by a multithreaded processor.

2. Description of the Related Art

A multithreaded processing system processes many pixel shader program threads simultaneously and maintains parameters used for computations for each pixel shader program thread. In order to reduce the storage resources needed to store the parameters, it is desirable to share common parameters between pixel shader program threads rather than store a separate copy of the common parameters for each pixel shader program thread. Reducing the die area needed for the parameter storage may reduce the cost of the multithreaded processing system.

Accordingly, there is a desire to assemble pixel shader program threads for execution based on limited parameter storage resources within the multithreaded processor.

SUMMARY OF THE INVENTION

The current invention involves new systems and methods for assembling pixel shader program threads for execution based on resource limitations of a multithreaded processor. Pixels to be processed by the pixel shader program are assembled into a launch group for processing by the multithreaded processor as multiple shader program threads. The launch group is assembled in a pixel shader program thread buffer based on resource limitations of the multithreaded processor so that common parameters shared by multiple pixels are not stored separately for each pixel. Therefore, storage resources needed to store the common parameters may be reduced in order to save die area.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for assembling pixel shader program threads for execution based on resource limitations of a multithreaded processor. The assembly method permits efficient use of the limited parameter storage resources, allowing more shader program threads to execute simultaneously and improving processing throughput. Pixels to be processed by the pixel shader program are assembled into a launch group for processing by the multithreaded processor as multiple shader program threads. The launch group is assembled in a pixel shader program thread buffer so that common parameters shared by multiple pixels are not stored separately for each pixel. Therefore, storage resources needed to store the common parameters are used more efficiently and may even be reduced in order to save die area and reduce system costs.

Figure 1:
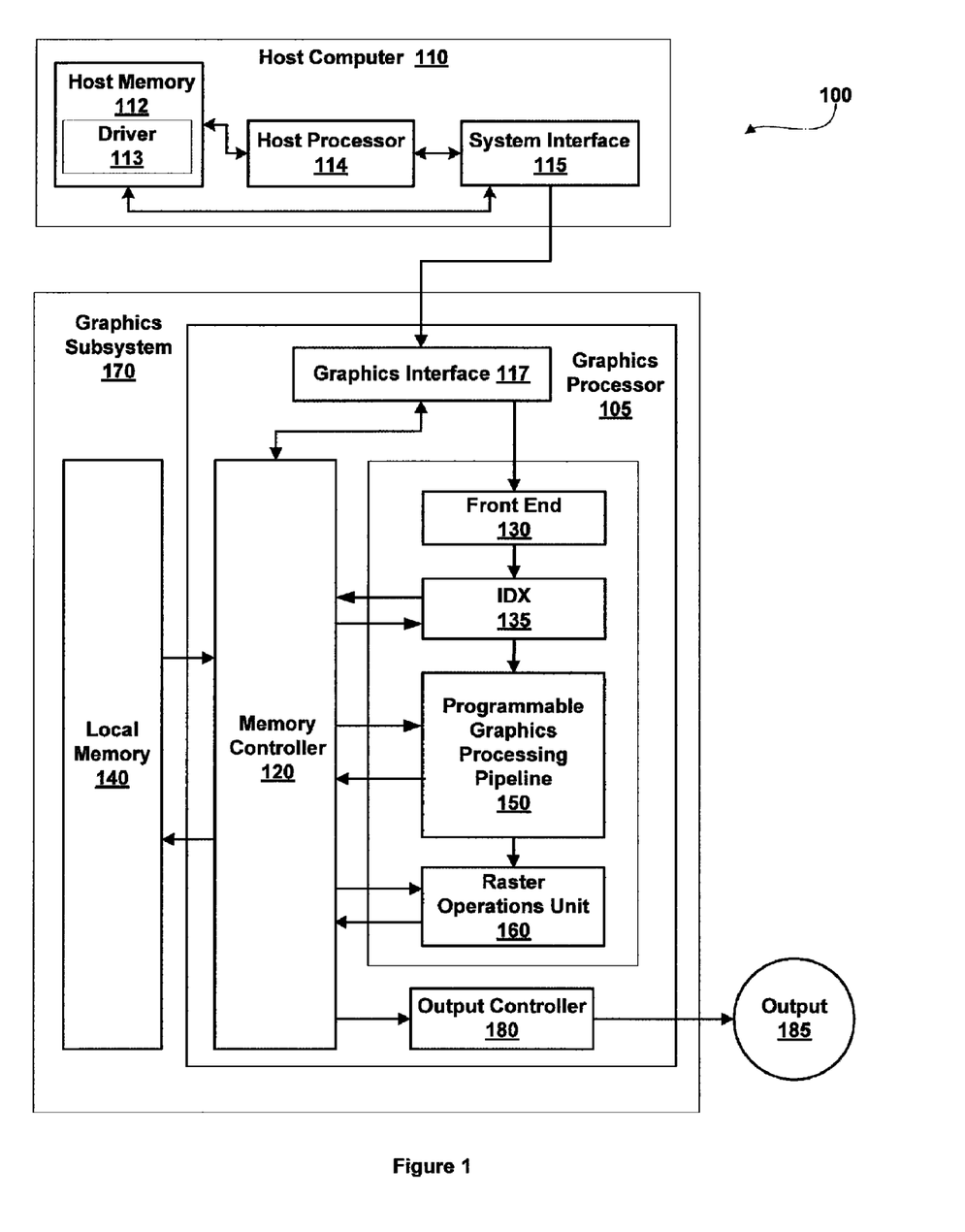
FIG. 1 illustrates a computing system including a host computer and a graphics subsystem in accordance with one or more aspects of the present invention.

FIG. 1 illustrates a computing system generally designated 100 including a host computer 110 and a graphics subsystem 170 in accordance with one or more aspects of the present invention. Computing system 100 may be a desktop computer, server, laptop computer, personal digital assistant (PDA), palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. Examples of system interface 115 known in the art include Intel® Northbridge.

A graphics device driver, driver 113, interfaces between processes executed by host processor 114, such as application programs, and a programmable graphics processor 105, translating program instructions as needed for execution by graphics processor 105. Host computer 110 communicates with graphics subsystem 170 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor. Graphics memory can include portions of host memory 112, local memory 140, register files coupled to the components within graphics processor 105, and the like.

Graphics processor 105 includes, among other components, front end 130 that receives commands from host computer 110 via graphics interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. IDX 135, programmable graphics processing pipeline 150 and a raster operations unit 160 each include an interface to memory controller 120 through which program instructions and data can be read from memory, e.g., any combination of local memory 140 and host memory 112.

IDX 135 optionally reads processed data, e.g., data written by raster operations unit 160, from memory and outputs the data, processed data and formatted commands to programmable graphics processing pipeline 150. Programmable graphics processing pipeline 150 and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable graphics processing pipeline 150 and raster operations unit 160 are each optionally configured such that data processing operations are performed in multiple passes through those units or in multiple passes within programmable graphics processing pipeline 150. Programmable graphics processing pipeline 150 and raster operations unit 160 also each include a write interface to memory controller 120 through which data can be written to memory.

In a typical implementation, programmable graphics processing pipeline 150 performs geometry computations, rasterization, and pixel computations. Therefore, programmable graphics processing pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 150 are passed to raster operations unit 160, which optionally performs near and far plane clipping and raster operations, such as stencil, z test, and the like, and saves the results or the samples output by programmable graphics processing pipeline 150 in local memory 140. When the data received by graphics subsystem 170 has been completely processed by graphics processor 105, an output 185 of graphics subsystem 170 is provided using an output controller 180. Output controller 180 is optionally configured to deliver data to a display device, network, electronic control system, other computing system 100, other graphics subsystem 170, or the like. Alternatively, data is output to a film recording device or written to a peripheral device, e.g., disk drive, tape, compact disk, or the like.

Figure 2:
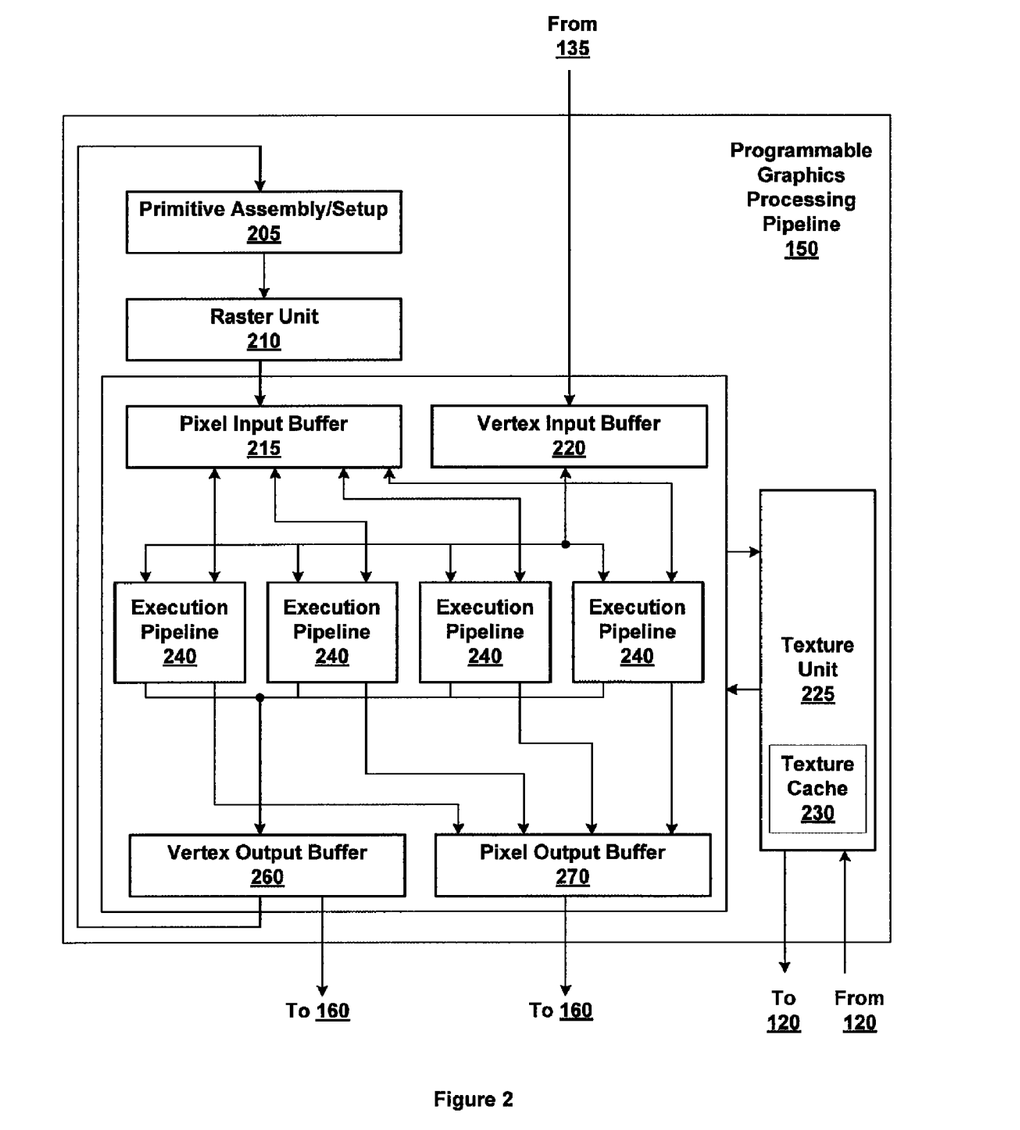
FIG. 2 illustrates the programmable graphics processing pipeline of FIG. 1 in accordance with one or more aspects of the present invention.

FIG. 2 illustrates programmable graphics processing pipeline 150 of FIG. 1 in accordance with one or more aspects of the present invention. At least one set of samples is output by IDX 135 and received by programmable graphics processing pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by programmable graphics processing pipeline 150 and stored in a vertex input buffer 220 including a register file, FIFO (first in first out), cache, or the like (not shown). The samples are broadcast from vertex input buffer 220 to execution pipelines 240, four of which are shown in FIG. 2. Each execution pipeline 240 includes at least one multithreaded processing unit, to be described further herein. The samples output by vertex input buffer 220 can be processed by any one of the execution pipelines 240. A sample is accepted by an execution pipeline 240 when a processing thread within the execution pipeline 240 is available to process the sample. Each execution pipeline 240 signals to vertex input buffer 220 when a sample can be accepted or when a sample cannot be accepted. In one embodiment of the present invention, programmable graphics processing pipeline 150 includes a single execution pipeline 240 containing one multithreaded processing unit. In other embodiments of the present invention, programmable graphics processing pipeline 150 includes a plurality of execution pipelines 240.

Execution pipelines 240 may receive first samples, such as higher-order surface data, and tessellate the first samples to generate second samples, such as vertices. Execution pipelines 240 may be configured to transform the second samples from an object-based coordinate representation (object space) to an alternatively based coordinate system such as world space or normalized device coordinates (NDC) space. Each execution pipeline 240 may communicate with texture unit 225 using a read interface (not shown in FIG. 2) to read program instructions and graphics data such as texture maps from local memory 140 or host memory 112 via memory controller 120 and a texture cache 230. Texture cache 230 is used to improve memory read performance by reducing read latency. In one embodiment of the present invention, texture cache 230 is omitted. In another embodiment of the present invention, a texture unit 225 is included in each execution pipeline 240. Alternatively, each execution pipeline 240 has a dedicated instruction read interface to read program instructions from local memory 140 or host memory 112 via memory controller 120.

Execution pipelines 240 output processed samples, such as vertices, that are stored in a vertex output buffer 260 including a register file, FIFO, cache, or the like (not shown). Processed vertices output by vertex output buffer 260 are received by a primitive assembly/setup unit 205. Primitive assembly/setup unit 205 calculates parameters, such as deltas, slopes, and plane equation coefficients, to rasterize the processed vertices and outputs triangle edges and the plane equation coefficients to a raster unit 210. Raster unit 210 scan converts the triangle edges to produce fragments and outputs a stream of samples, to a pixel input buffer 215. Alternatively, raster unit 210 resamples processed vertices and outputs additional vertices to pixel input buffer 215.

Pixel input buffer 215 outputs the samples to each execution pipeline 240. Samples, such as pixels and fragments, output by pixel input buffer 215 are each processed by only one of the execution pipelines 240. Pixel input buffer 215 determines which one of the execution pipelines 240 to output each sample to depending on an output pixel position, e.g., (x,y), associated with each sample. In this manner, each sample is output to the execution pipeline 240 designated to process samples associated with the output pixel position. In an alternate embodiment of the present invention, each sample output by pixel input buffer 215 is processed by one of any available execution pipelines 240.

Each execution pipeline 240 signals to pixel input buffer 215 when a sample can be accepted or when a sample cannot be accepted. Program instructions configure multithreaded processing units within an execution pipeline 240 to perform operations such as tessellation, perspective correction, texture mapping, shading, blending, and the like. Processed samples are output from each execution pipeline 240 to a pixel output buffer 270. Pixel output buffer 270 optionally stores the processed samples in a register file, FIFO, cache, or the like (not shown). The processed samples are output from pixel output buffer 270 to raster operations unit 160.

Figure 3A:
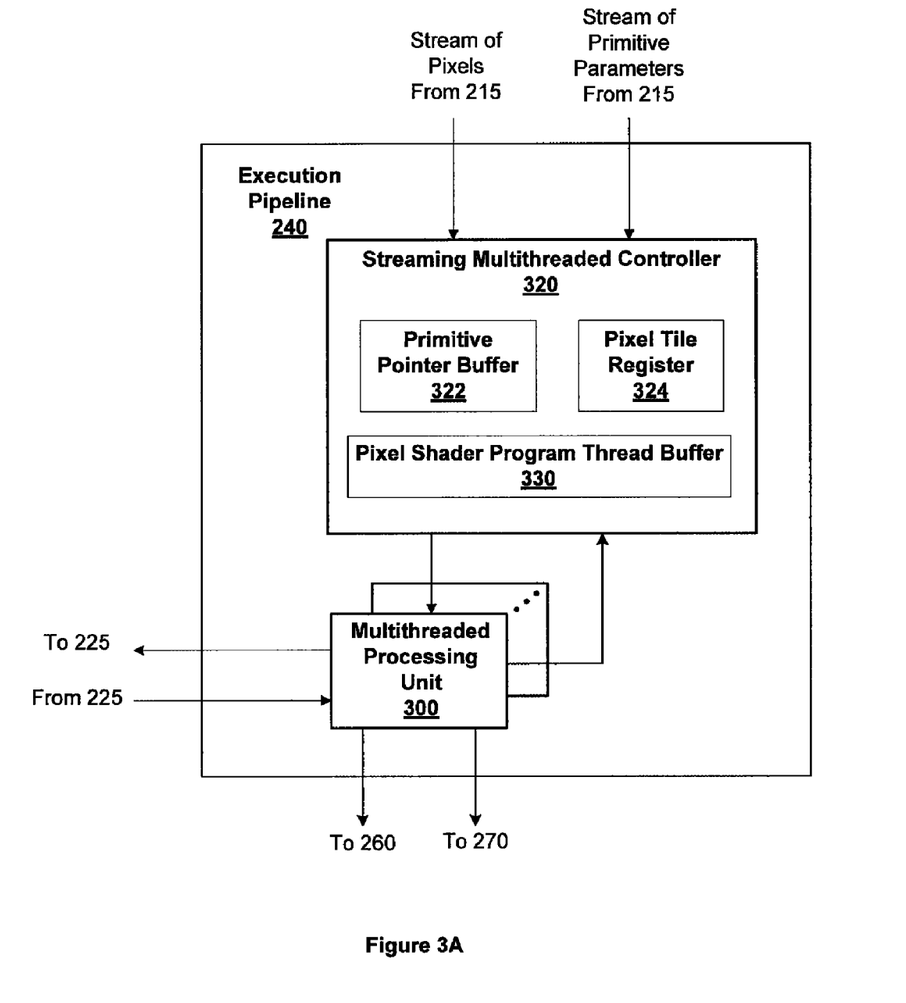
FIG. 3A illustrates the execution pipeline of FIG. 2 in accordance with one or more aspects of the present invention.

FIG. 3A illustrates execution pipeline 240 of FIG. 2, including at least one multithreaded processing unit 300, in accordance with one or more aspects of the present invention. A streaming multithreaded controller 320 receives a stream of primitive parameters from pixel input buffer 215 and a stream of pixels from pixel input buffer 215 and assembles the stream of pixels into launch groups including primitive parameter information for processing. Specifically, an assembled launch group is loaded into a pixel shader program thread buffer 330, as described in conjunction with FIGS. 5A and 5B. A launch group may include x,y pixel positions, a coverage mask, and primitive parameter information, as described in conjunction with FIG. 4C.

A primitive pointer buffer 322 stores pointers, e.g., primitive parameter information, to common primitive parameters (received as part of the stream of primitive parameters) that are stored by streaming multithreaded controller 320 in each multithreaded processing unit 300. Primitive pointer buffer 322 may be a register file, first-in first-out (FIFO) memory, or a random access memory (RAM). A pixel tile register 324 stores pixel tile parameters (received as part of the stream of pixel parameters) that are loaded into pixel shader program thread buffer 330, as described in conjunction with FIG. 5B. Pixel tile parameters are primitive parameter information that varies within a primitive. Unlike common primitive parameters that are shared between all pixels within a single primitive, pixel tile parameters are shared for pixels within a single primitive that are also included within a single pixel tile.

An execution pipeline 240 may contain a plurality of multithreaded processing units 300, wherein each multithreaded processing unit 300 may simultaneously process multiple threads. One characteristic of the system disclosed in FIGS. 1, 2, 3A, and 3B is that it may be configured to embody a SIMD (single instruction multiple data) architecture, where a thread is assigned to a group of samples processed in the one or more execution pipelines 240. Therefore, a single program may be used to process several samples or several groups of samples. Streaming multithreaded controller 320 receives a pointer to a program to process of the samples.

Figure 3B:
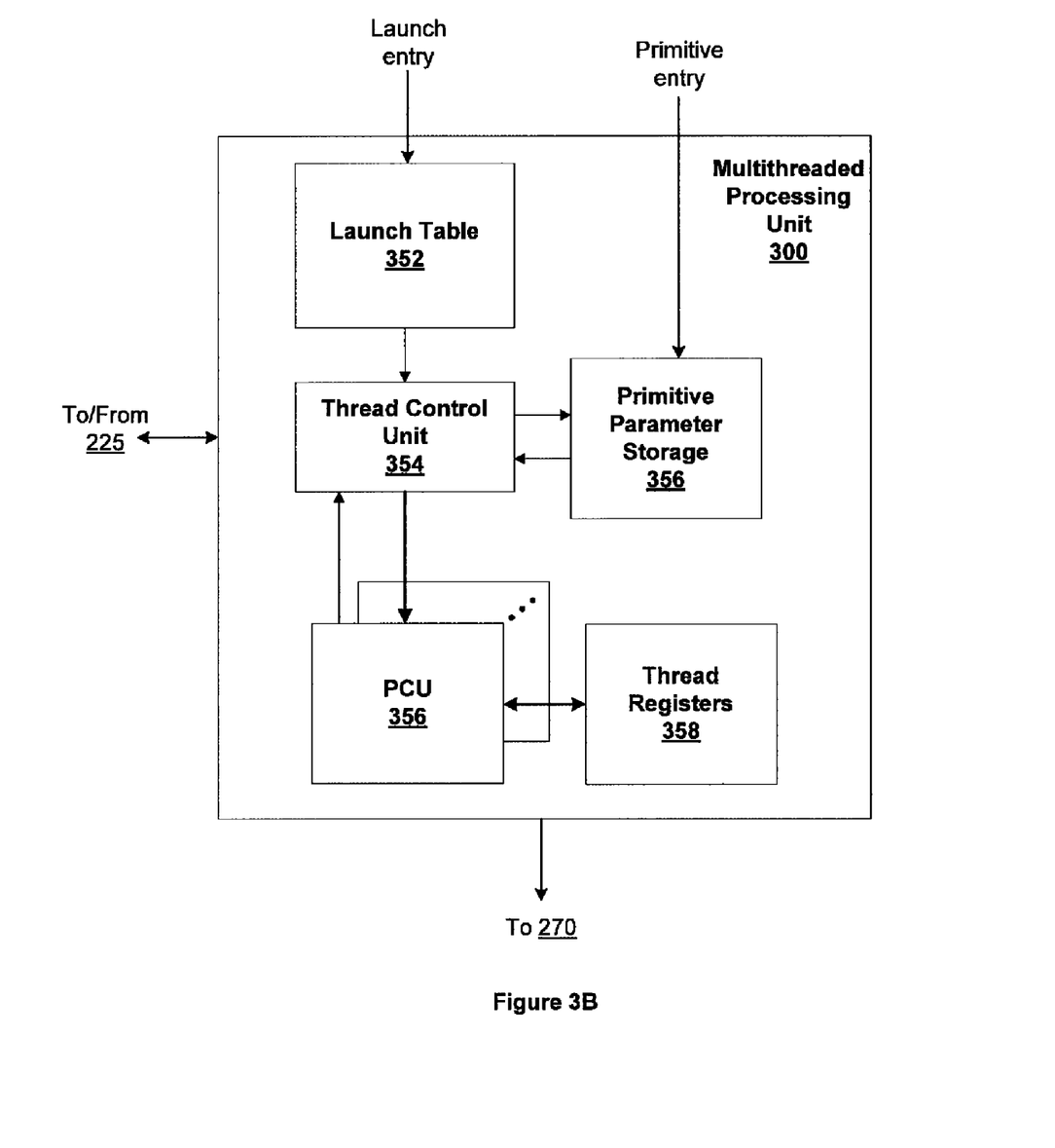
FIG. 3B illustrates the multithreaded processing unit of FIG. 3A in accordance with one or more aspects of the present invention.

FIG. 3B illustrates multithreaded processing unit 300 of FIG. 3A, in accordance with one or more aspects of the present invention. Streaming multithreaded controller 320 outputs an assembled launch group stored in pixel shader program thread buffer 330, referred to as a launch entry, to one multithreaded processing unit 300. Multithreaded processing unit 300 stores assembled launch groups received from shader program thread buffer 330 as launch entries in a launch table 352.

Streaming multithreaded controller 320 also loads common primitive parameters into a primitive parameter storage 356 as primitive entries. In some embodiments of the present invention, graphics primitives may include a different number of parameters. For example, one primitive may include color and one set of texture mapping parameters while another primitive may include depth and several sets of texture mapping parameters. Therefore, each primitive entry may occupy a different number of bytes of storage in primitive parameter storage 356.

An end of primitive signal is included in the primitive stream to indicate when the parameters for one primitive end and the parameters for another primitive begin. Streaming multithreaded controller 320 identifies an available entry in primitive parameter storage 356 and stores the primitive parameters in the available entry. Streaming multithreaded controller 320 stores a pointer to the entry in primitive pointer buffer 322. When an entry is not available in primitive parameter storage 356, streaming multithreaded controller 320 stalls the primitive stream, i.e., does not accept inputs from the primitive stream, until an entry becomes available. Entries become available when all of the pixels referencing the entry, i.e., within the primitive stored in the entry, have been processed by the multithreaded processing units 300 that access the entry.

Like the primitive stream, the pixel stream also includes an end of primitive signal to indicate when the pixels for one primitive end and the pixels for another primitive begin. Streaming multithreaded controller 320 maintains the correspondence between the primitive stream and pixel stream, stalling either stream as needed when space is not available in primitive parameter storage 356 to store primitive parameters or pixel shader program thread buffer 330 to store pixels. Once all of the pixels for a primitive have been received by streaming multithreaded controller 320 and loaded into pixel shader program thread buffer 330, the primitive pointer for the primitive may be removed from primitive pointer buffer 322.

Each set of primitive parameters corresponding to a particular graphics primitive is stored in a single entry in primitive parameter storage 356. Pixels that are within the particular graphics primitive reference the same entry in primitive parameter storage 356 using the same primitive pointer stored in primitive pointer buffer 322. Therefore, streaming multithreaded controller 320 maintains the correspondence between the pixels and primitive pointers to insert the appropriate primitive pointer(s) into each launch entry.

The launch entries are output by streaming multithreaded controller 320 to a launch table 352 within multithreaded processing unit 300. Unlike the primitive entries which are broadcast to all of the multithreaded processing units 300 within a particular execution pipeline 240, the launch entries are output to a single multithreaded processing unit 300 for processing. When all of the launch tables 352 accessible by a streaming multithreaded controller 320 are full, streaming multithreaded controller 320 waits for an entry to become available, stalling the pixel and/or primitive stream if necessary. Because each primitive entry is broadcast to and stored in all of the multithreaded processing units 300, storing common primitive parameters in a single entry that may be referenced by multiple launch entries reduces the amount of storage that is needed in primitive parameter storage 356 and reduces the die area needed for primitive parameter storage 356.

Multithreaded processing units 300 are configured using program instructions read via memory controller 120. Thread control unit 354 selects a group of threads, i.e., launch group, for execution and reads the launch table entry corresponding to the group of threads. Thread control unit 354 gathers source data specified by the program instructions, including primitive parameters stored in primitive parameter storage 356 and depth parameters stored in launch table 352, and dispatches the source data and program instructions to at least one PCU 375. PCUs 375 perform computations specified by the program instructions and output data to at least one destination, e.g., pixel output buffer 160, vertex output buffer 260 and streaming multithreaded controller 320. PCUs 356 may store temporary computations in thread registers 358 during execution of the program instructions. Thread control unit 354 continues processing each launch group, possibly interleaving the execution of different launch groups, until the pixel program has been completely executed.

In one embodiment of the present invention, thread control unit 354 assigns a thread (threadID) to each thread, i.e., sample in a launch group, to be processed. A thread includes a pointer to a program instruction (program counter), such as the first instruction within the program, thread state information, and storage resources within thread registers 358 for storing intermediate data generated when processing the sample. Samples within the launch group that are not covered according to the coverage mask are not processed. Additionally, there are points in a program (i.e., branches) where threads in a launch group are allowed to "diverge" from one another so that one or more threads may execute instructions on their respective samples that do not need to be executed by the other threads in the thread group. Divergent threads in a thread group may be synchronized at various points in the program to guarantee that some level of synchronized processing may be achieved at those points. Once all of the threads in the thread group are synchronized, the threads resume execution in lock-step, i.e. each sample is processed by the same sequence of instructions in a SIMD manner.

Thread control unit 354 uses the program counter for each thread group to read program instructions to execute the threads in the thread group. Source data is gathered and the program instruction is output to one of the PCUs 375 for execution. The source data may be read from launch table 352, primitive parameter storage 356, local memory 140, host memory 112, or the like. Processed samples are output to a destination specified by the instruction. The destination may be vertex output buffer 260, pixel output buffer 270, or registers within multithreaded processing unit 300. Alternatively, the destination may also include local memory 140, host memory 112, or the like.

When operating in a synchronized mode, each thread being processed by a particular multithreaded processing unit 300 independently executes the same operations (or instructions) on its respective samples. This type of synchronized processing is advantageous because, among other things, it allows groups of like samples to be processed simultaneously, which increases graphics processing efficiency.

In one embodiment, execution pipeline 240 may be configured to simultaneously process twenty-four independent thread groups. The different thread groups may be simultaneously processed in a MIMD (multiple instruction multiple data) manner relative to each other since each thread group may be processed by a different program or a different portion of the same program. In one embodiment, each thread group may include up to thirty-two samples. A particular multithreaded processing unit 300 within execution pipeline 240 may process one or more such thread groups. Launch table 352 may store 24 launch entries that each include 16 pixels (4 sets of 4 pixels) and all of the launch entries may be simultaneously executed by PCUs 356.

Figure 4A:
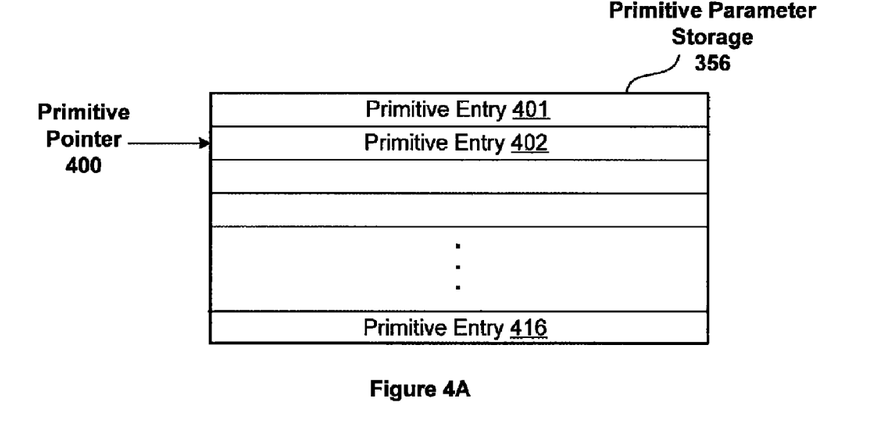
FIG. 4A illustrates a conceptual diagram of the primitive parameter storage of FIG. 3B in accordance with one or more aspects of the present invention.

FIG. 4A illustrates a conceptual diagram of primitive parameter storage 356 of FIG. 3B in accordance with one or more aspects of the present invention. Primitive parameter storage 356 is a storage resource, e.g., register file, RAM (random access memory), or the like, that includes several entries, e.g., primitive entries 401, 402, and 416, where each primitive entry is configured to store parameters for a particular primitive. The parameters are written by streaming multithreaded controller 320 and read by thread control unit 354. The parameters may include plane equation coefficients (A, B, and C) used to compute per sample component values, e.g., color, depth, texture map coordinates, or the like, for a specific x,y position by computing component(x,y)=Ax+By+C. In other embodiments of the present invention, parameters other than plane equation coefficients may be stored in a primitive entry. A unique primitive pointer, such as primitive pointer 400, corresponds to each entry in primitive parameter storage 356.

In some embodiments of the present invention, each entry may store a different number of parameters, depending on the parameters specified for the primitive. A combination of primitive pointer 400 and an offset for a particular parameter stored in the entry is used to access the particular parameter during execution of an instruction. For example, a program instruction, IPA R0 f[3] that specifies an interpolation computation sources plane equation coefficients for a particular parameter of a primitive, where the particular parameter is stored at an offset of 3 within an entry of primitive parameter storage 356. The address used to read the particular primitive may be computed as the primitive pointer+offset. The destination for the interpolation computation is R0, which may be a register in thread registers 358.

Figure 4B:
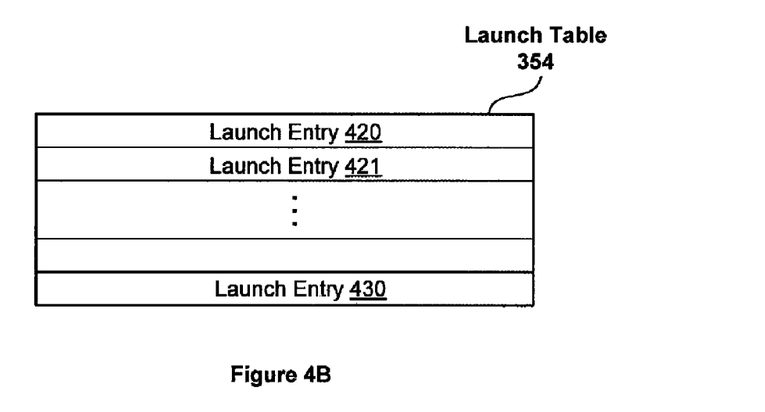
FIG. 4B illustrates a conceptual diagram of the launch table of FIG. 3B in accordance with one or more aspects of the present invention.

FIG. 4B illustrates a conceptual diagram of launch table 352 of FIG. 3B in accordance with one or more aspects of the present invention. Launch table 352 is also a storage resource, e.g., register file, RAM, or the like, that includes several entries, e.g., launch entries 420, 421, and 430, where each entry is configured to store a launch entry that was assembled by streaming multithreaded controller 320 in pixel shader program thread buffer 330. The launch entries are written by streaming multithreaded controller 320 and read, during thread execution, by thread control unit 354.

Figure 4C:
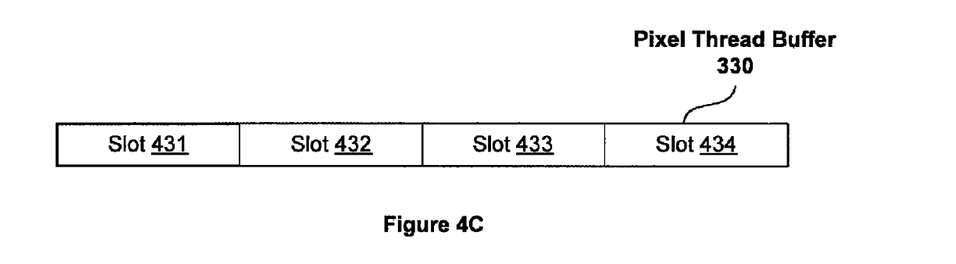
FIG. 4C illustrates a conceptual diagram of a launch table entry in accordance with one or more aspects of the present invention.

FIG. 4C illustrates a conceptual diagram of a launch table entry assembled in pixel shader program thread buffer 330 of FIG. 3A, in accordance with one or more aspects of the present invention. In one embodiment of the present invention pixel shader program thread buffer 330 includes 4 slots, slots 431, 432, 433, and 434. Other embodiments of the present invention may include more or fewer slots in pixel shader program thread buffer 330. Each slot is loaded with (x,y) coordinates for a set of pixels specifying an (x,y) position. The set of pixels includes one or more pixels, where the pixels are adjacent, for example a 2×2 pixel quad. The position of each pixel within the set can be derived from the (x,y) coordinates.

One or more primitive pointers are also stored in pixel shader program thread buffer 330. A large primitive may cover many pixels, even many launch groups, so a single primitive pointer may be used for several launch entries. In contrast, when the primitives are small, each set of pixels may lie within a different primitive and a different primitive pointer corresponds to each set of pixels. In order to accommodate small primitives while not requiring storage for a unique primitive pointer for each slot, i.e., set of pixels, a primitive pointer is shared between two slots in pixel shader program thread buffer 330. Therefore, each slot effectively stores half of the shared primitive pointer. Primitive parameter storage 356 may be embodied as two storage resources, e.g. two banks of RAM, in order to read two primitive entries in parallel, one corresponding to each primitive pointer in a launch entry assembled by pixel shader program thread buffer 330. Other embodiments of the present invention may store a primitive pointer for each slot or a single primitive pointer for a launch group.

Other primitive parameters that may vary for one or more pixel sets within a primitive, such as pixel tile parameters, may also be stored in a slot or shared between sets of pixels stored in adjacent slots. Since launch table 354 is sized to store several launch entries, reducing the size of each entry by sharing parameters and primitive pointers between two or more slots may reduce the die area while accommodating small primitives and parameters that vary within a primitive. Finally, in addition to the primitive pointers and pixel set positions, pixel shader program thread buffer 330 includes a coverage mask indicating the pixels within each pixel set that are covered by a primitive. When each pixel set includes 4 pixels, the coverage mask portion for each slot is 4 bits, for a total coverage mask of 16 bits for the launch group.

Figure 5A:
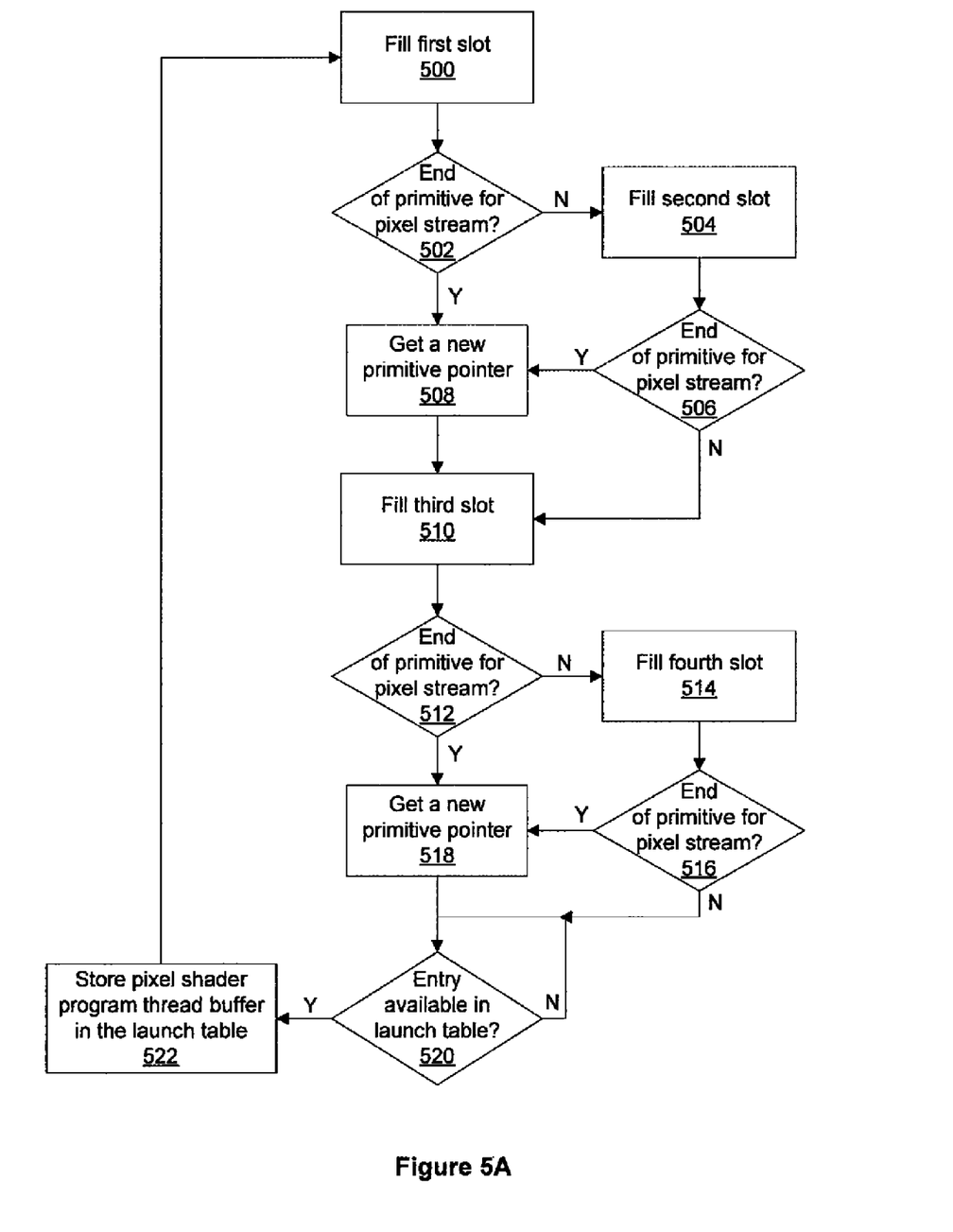
FIG. 5A illustrates a flow diagram of an exemplary method of assembling a pixel shader program thread buffer of FIG. 3B for execution of a pixel shader program in accordance with one or more aspects of the present invention.

FIG. 5A illustrates a flow diagram of an exemplary method of assembling a launch entry in pixel shader program thread buffer 330 of FIG. 3B for execution of a pixel shader program, in accordance with one or more aspects of the present invention. In step 500 streaming multithreaded controller 320 fills a first slot, slot 431 with a position and coverage mask for a first pixel set received in the stream of pixels. In step 500 streaming multithreaded controller 320 also fills the first slot with a primitive pointer corresponding to a first primitive that includes the first pixel set. As previously described, the primitive pointer for the first primitive is stored in primitive pointer buffer 322 and is copied into the first slot of pixel shader program thread buffer 330.

In step 502 streaming multithreaded controller 320 determines if the first pixel set is the end of the first primitive, i.e., is the last pixel set of the first primitive. If, in step 502 streaming multithreaded controller 320 determines that the first pixel set is the end of the first primitive, then streaming multithreaded controller 320 proceeds directly to step 508. Otherwise, in step 504 streaming multithreaded controller 320 fills a second slot, slot 432 with a position and coverage mask for a second pixel set received in the stream of pixels and proceeds to step 506. Because an end of primitive signal was not included in the pixel stream between the first pixel set and the second pixel set, both pixel sets are within the first primitive. Therefore, a primitive pointer may be shared between the slots storing the two pixel sets.

In step 506 streaming multithreaded controller 320 determines if the second pixel set is the end of the first primitive, and, if so, streaming multithreaded controller 320 proceeds to step 508. Otherwise, streaming multithreaded controller 320 proceeds to step 510. In step 508 streaming multithreaded controller 320 obtains a new primitive pointer, the primitive pointer for the second primitive from primitive pointer buffer 322. The first primitive pointer may be removed from primitive pointer buffer 322 and reused when all of the pixels within the first primitive have been processed by the pixel shader program.

In step 510 streaming multithreaded controller 320 fills a third slot, slot 423 with a position and coverage mask for a third pixel set received in the stream of pixels. In step 510 streaming multithreaded controller 320 also fills the third slot with the primitive pointer available at the output of primitive pointer buffer 322. The primitive pointer may correspond to the second primitive or the first primitive, depending on whether or not an end of primitive signal was received in the pixel stream.

In step 512 streaming multithreaded controller 320 determines if the third pixel set is the end of a primitive, and, so streaming multithreaded controller 320 proceeds directly to step 518. Otherwise, in step 514 streaming multithreaded controller 320 fills the fourth slot, slot 424 with a position and coverage mask for a fourth pixel set received in the stream of pixels. In step 516 streaming multithreaded controller 320 determines if the fourth pixel set is the end of the primitive, and, if so, streaming multithreaded controller 320 proceeds to step 518. Otherwise, streaming multithreaded controller 320 proceeds to step 520. In step 518 streaming multithreaded controller 320 obtains a new primitive pointer from primitive pointer buffer 322. The primitive pointer corresponding to the fourth and/or third set of pixels may be removed from primitive pointer buffer 322.

In step 520 streaming multithreaded controller 320 determines if an entry is available in a launch table 352 within a multithreaded processing unit 300, and, if not, streaming multithreaded controller 320 remains in step 520. Otherwise, in step 522 streaming multithreaded controller 320 stores pixel shader program thread buffer 330 into the available entry of a launch table 352. Streaming multithreaded controller 320 may then return to step 500 to assemble another launch group in pixel shader program thread buffer 330.

In some embodiments of the present invention, additional parameters that vary within a primitive, but not within a pixel set, are stored in pixel shader program thread buffer 330 and shared between two pixel sets (slots). Again, sharing the additional parameters between two pixel sets reduces the number of bits needed to store each launch entry in launch table 354, thereby reducing the die area requirements.

An example of an additional parameter that may vary across a primitive, but not within a pixel set, is a plane equation coefficient for a depth component. In particular, the A and B plane equation coefficients may be lower resolution than the C plane equation coefficient and may be constant for a single primitive. The C plane equation coefficient may vary for a primitive and may be computed for each pixel tile that is at least partially covered by a primitive. An output image may be divided into pixel tiles, where each pixel tile includes an n×m region of pixels. An advantage of computing the C plane equation coefficient for each pixel tile is that fewer bits may be used to represent the A, B, and C plane equation coefficients for depth compared with using a single plane equation for a primitive that covers multiple pixel tiles.

Rather than storing multiple C plane equation coefficients in each primitive entry, varying C plane equation coefficients may be included as a pixel tile parameter in the launch group with the pixel sets. Furthermore, pixel tile parameter may be stored at higher resolution than the coefficients stored in primitive parameter storage 356. For example, when primitive parameter storage 356 is configured to store 32 bits for each coefficient, a higher resolution coefficient, such as a 35 bit coefficient may be stored in the launch group. When a pixel shader program computes depth using a per pixel tile C coefficient, the computed depth should equal a depth computed by raster operation unit 160, also computed using a per pixel tile C coefficient, and used for hidden surface removal.

Figure 5B:
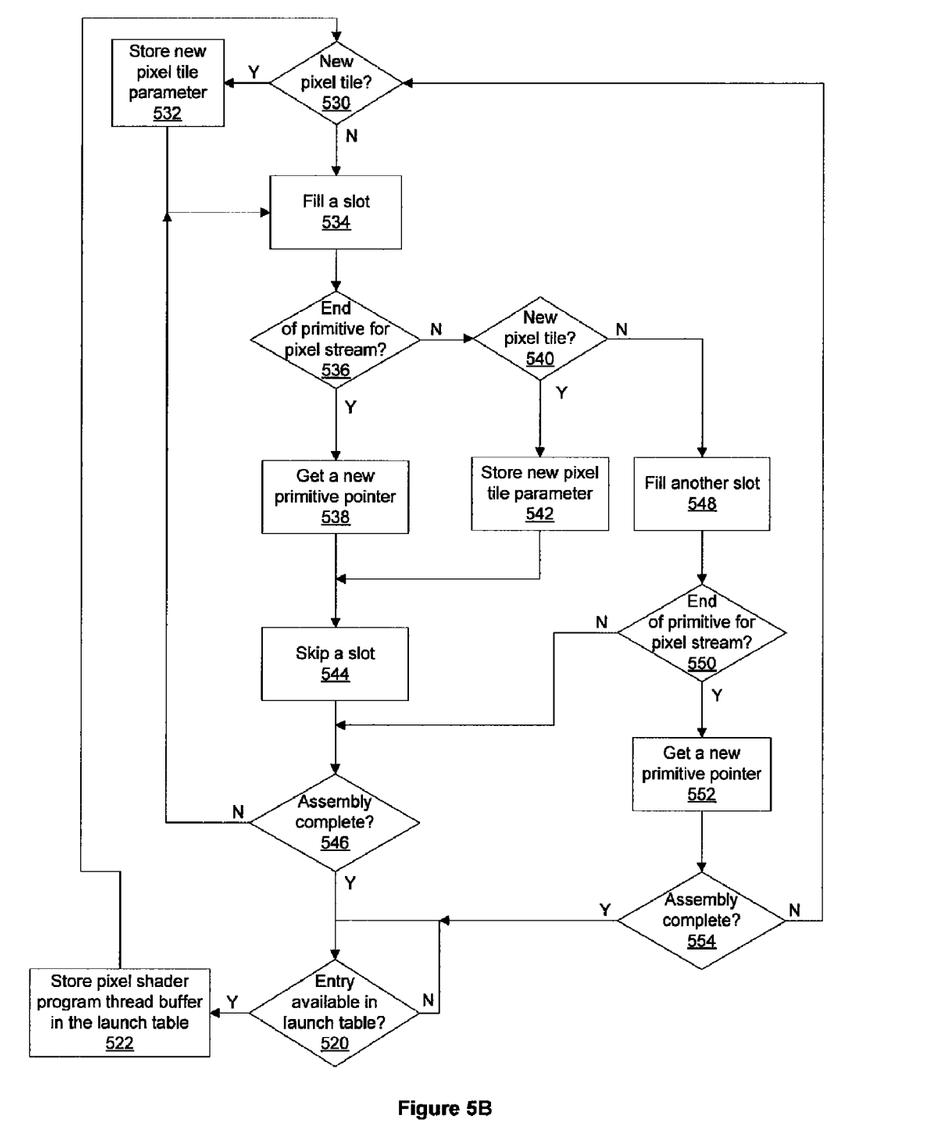
FIG. 5B illustrates a flow diagram of another exemplary method of assembling a pixel shader program thread buffer of FIG. 3B for execution of a pixel shader program in accordance with one or more aspects of the present invention.

FIG. 5B illustrates a flow diagram of another exemplary method of assembling pixel shader program thread buffer 330 including additional parameters that vary for a primitive, such as pixel tile parameters, in accordance with one or more aspects of the present invention. In step 530 streaming multithreaded controller 320 determines if a new pixel tile signal is asserted, indicating that a first pixel set received in the stream of pixels includes a new pixel tile parameter, and, if not streaming multithreaded controller 320 proceeds directly to step 534. Otherwise, in step 532 streaming multithreaded controller 320 stores the new pixel tile parameter in pixel tile register 324. In step 534 streaming multithreaded controller 320 fills a first slot of pixel shader program thread buffer 330 (launch group), slot 431 with a position and coverage mask for the first pixel set received in the stream of pixels. In step 530 streaming multithreaded controller 320 also fills the first slot with a primitive pointer corresponding to a first primitive that includes the first pixel set and the new pixel tile parameter. In some embodiments of the present invention, the new pixel tile signal is used to indicate that a new additional parameter other than or in addition to the new pixel tile parameter is included with the first pixel set and the new additional parameter is stored in pixel tile register 324.

In step 536 streaming multithreaded controller 320 determines if the first pixel set is the end of the first primitive, and, if so, streaming multithreaded controller 320 in step 538 obtains a new primitive pointer from primitive pointer buffer 322. Otherwise, in step 540 streaming multithreaded controller 320 determines if the new pixel tile signal is asserted, indicating that a second pixel set received in the stream of pixels includes a new pixel tile parameter. If, in step 540 streaming multithreaded controller 320 determines that the new pixel tile signal is asserted, then in step 542 streaming multithreaded controller 320 stores the new pixel tile parameter in pixel tile register 324 and proceeds to step 544.

In step 544 streaming multithreaded controller 320 skips a slot since at least one of the primitive pointer and the pixel tile parameter cannot be shared between the first pixel set and the second pixel set. Leaving a slot empty may reduce the processing throughput of multithreaded processing unit 300. However, reducing the number of bits needed in each launch entry reduces the die area needed for launch table 352 and primitive parameter storage 356. Empty slots will be needed only when the pixel tile parameter changes for each pixel set or when the primitives lie within each pixel set.

In step 546 streaming multithreaded controller 320 determines if pixel shader program thread buffer 330 is full, i.e., a launch entry has been assembled, and, if so, streaming multithreaded controller 320 proceeds to step 520. Otherwise, streaming multithreaded controller 320 returns to step 534 to fill a third slot, slot 423 with a position, coverage mask, primitive pointer, and pixel tile Parameter for a third pixel set received in the stream of pixels.

If, in step 540 streaming multithreaded controller 320 determines that the new pixel tile signal is not asserted, then in step 548 streaming multithreaded controller 320 fills a second slot, slot 432 with a position and coverage mask for a second pixel set received in the stream of pixels and proceeds to step 550. Because a new pixel tile signal was not included in the pixel stream between the first pixel set and the second pixel set, both pixel sets are within the same pixel tile. Therefore, the additional parameter, the pixel tile parameter may be shared between the slots storing the two pixel sets, just as the primitive pointer is shared.

In step 550 streaming multithreaded controller 320 determines if the second pixel set is the end of the first primitive, and, if so, streaming multithreaded controller 320 proceeds to step 552. Otherwise, streaming multithreaded controller 320 proceeds directly to step 554. In step 552 streaming multithreaded controller 320 obtains a new primitive pointer, the primitive pointer for the second primitive from primitive pointer buffer 322. In step 554 streaming multithreaded controller 320 determines if pixel shader program thread buffer 330 is full, i.e., a launch group has been assembled, and, if so, streaming multithreaded controller 320 proceeds to step 520. Otherwise, streaming multithreaded controller 320 returns to step 530 to fill a third slot, slot 423 with a position, coverage mask, primitive pointer, and pixel tile parameter for a third pixel set received in the stream of pixels.

In step 520 streaming multithreaded controller 320 determines if an entry is available in a launch table 352 within a multithreaded processing unit 300, and, if not, streaming multithreaded controller 320 remains in step 520. Otherwise, in step 522 streaming multithreaded controller 320 stores pixel shader program thread buffer 330 (the launch group) into the available entry of a launch table 352. Streaming multithreaded controller 320 may then return to step 500 to assemble another launch group in pixel shader program thread buffer 330.

Figure 6:
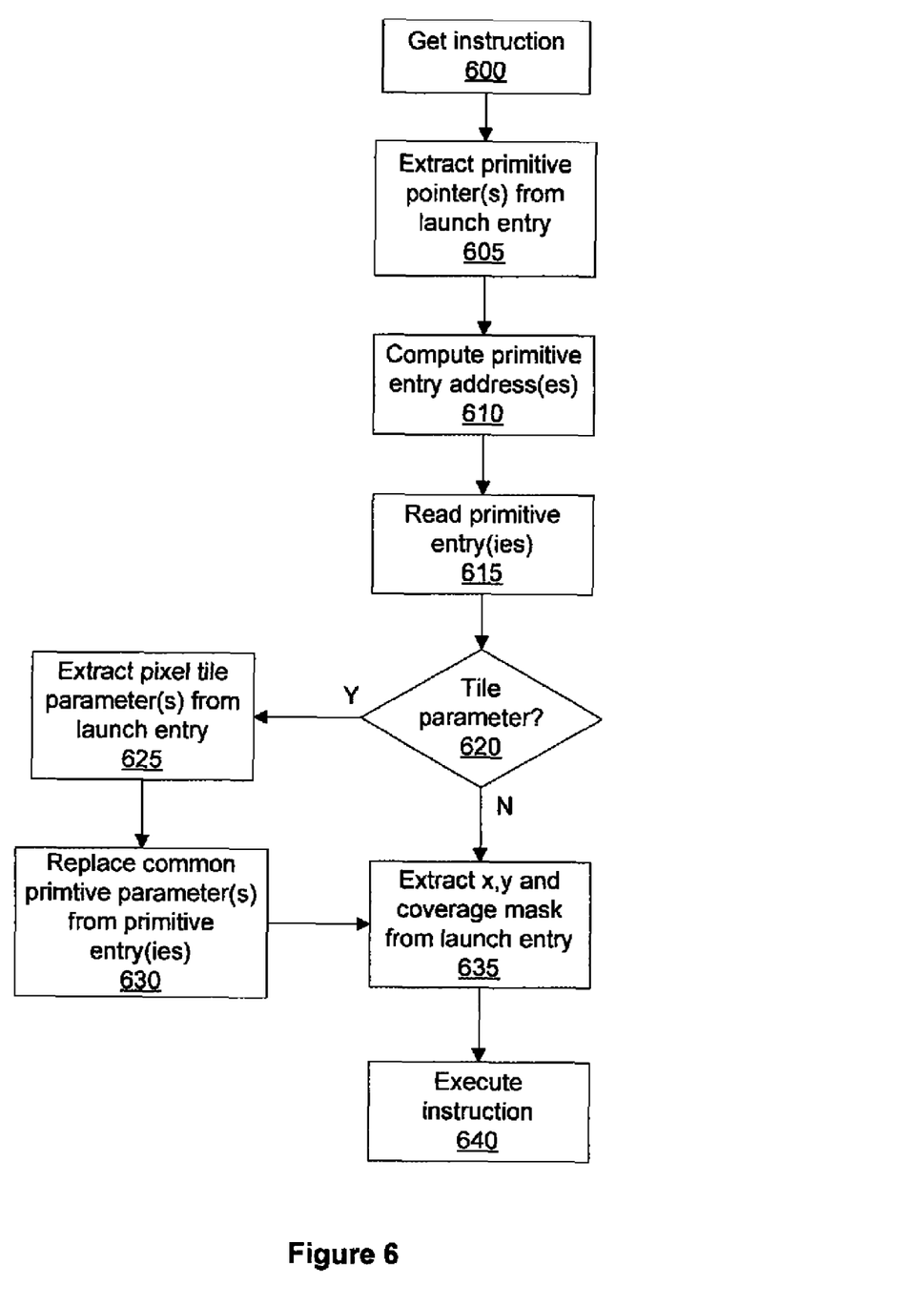
FIG. 6 illustrates a flow diagram of an exemplary method of executing the pixel shader program using assembled pixel shader program thread buffers in accordance with one or more aspects of the present invention.

FIG. 6 illustrates a flow diagram of an exemplary method of executing the pixel shader program using assembled pixel shader program thread buffers in accordance with one or more aspects of the present invention. In step 600 thread control unit 354 obtains a pixel shader program instruction for processing a pixel thread group. In step 605 thread control unit 354 reads a launch table entry and extracts the primitive pointer(s) from the launch entry. In step 610 thread control unit 354 computes primitive entry address(es) for each primitive pointer extracted in step 650. In step 615 thread control unit 354 reads one or more primitive entries from primitive parameter storage 356 using the primitive entry address(es) computed in step 610.

In step 620 thread control unit 354 determines if the instruction is a tile computation, such as a depth computation, and, if not, in thread control unit 354 proceeds directly to step 635. Otherwise, in step 625 thread control unit 354 extracts the pixel tile parameter(s) stored in the launch table entry. In step 630 thread control unit 354 replaces the parameter(s) included in the primitive entry(ies) with the pixel tile parameter(s) extracted from the launch entry. In step 635 thread control unit 635 extracts the pixel set position (x,y) coordinates and coverage mask from the launch entry. In step 640 thread control unit 354 executes the instruction by gathering any other source data and outputting the pixel shader program instruction, primitive parameters, pixel set position, and coverage mask to PCUs 356. Each launch entry may be read several times by thread control unit 354 to completely process the pixels according to the pixel shader program.

Persons skilled in the art will appreciate that any system configured to perform the method steps of FIG. 5A, 5B, or 6, or their equivalents, is within the scope of the present invention. The pixel shader program thread assembly process permits efficient use of the limited parameter storage resources, allowing more shader program threads to execute simultaneously thereby improving processing throughput. The pixels are assembled into a pixel shader program thread buffer so that common parameters shared by multiple pixels are not stored separately for each pixel. Therefore, storage resources needed to store the common parameters are more efficiently used and may be reduced in order to save die area.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:
1. A method of assembling pixel shader program threads for execution, comprising:
receiving a first pixel position associated with a first set of pixels that is included within a first primitive;

storing the first pixel position in a first subsection of a pixel shader program thread buffer;

storing a copy of a first primitive pointer in the first subsection, wherein the first primitive pointer is extracted from a primitive pointer buffer and references a primitive parameter value for generating at least a portion of the first set of pixels and at least a portion of a second set of pixels;

storing, in the first subsection, an additional primitive parameter value that is constant within the first set of pixels;

storing a coverage mask in the first subsection to determine the portion of the first set of pixels to be generated using the primitive parameter value;

receiving a second pixel position associated with the second set of pixels;

determining that the second set of pixels is included within the first primitive and storing the second pixel position in the second subsection of the pixel shader program thread buffer; and storing a second copy of the first primitive pointer in the second subsection, wherein the primitive parameter value is referenced by both the copy of the first primitive pointer in the first subsection and the second copy of the first primitive pointer in the second subsection.

2. The method of claim 1, wherein the primitive parameter value is stored in an entry of a storage resource comprising a plurality of entries, wherein each of the plurality of entries is configured to store a primitive parameter value corresponding to one of a plurality of primitives.

3. The method of claim 1, further comprising:
combining the coverage mask with any other coverage masks in the pixel shader program thread buffer to produce a combined coverage mask;
outputting the pixel shader program thread buffer to a multithreaded processing unit as a launch entry; and
simultaneously processing each pixel in the launch entry that is covered by a primitive as indicated by the combined coverage mask using the multithreaded processing unit.

4. The method of claim 1, further comprising:
determining if the second set of pixels is included within a pixel tile that includes the first set of pixels;
storing the second pixel position in the second subsection of the pixel shader program thread buffer when the second set of pixels is included within the pixel tile; and
storing the second pixel position in the third subsection of the pixel shader program thread buffer when the second set of pixels is not included within the pixel tile.

5. A method of executing a pixel shader program using assembled pixel shader program thread buffers, comprising:
obtaining a pixel shader program instruction for processing an assembled pixel shader program thread buffer comprising a first subsection and a second subsection;
extracting a primitive pointer from the assembled pixel shader program thread buffer, wherein a copy of the primitive pointer is stored in the first subsection and a second copy of the primitive pointer is stored in the second subsection;
reading a primitive parameter value stored in an entry of a storage resource referenced by the primitive pointer, wherein the primitive parameter value corresponds to a primitive;
extracting, from the first subsection, an additional primitive parameter that is constant within a first set of pixel positions associated with the first subsection;
extracting a first coverage mask from the first subsection;

applying the first coverage mask to the first set of pixel positions to identify a subset of the first set of pixel positions included in the primitive, wherein the step of processing the first set of pixel positions only processes the identified subset;
generating a first set of pixel positions from a first pixel position stored in the first subsection;
generating a second set of pixel positions from a second pixel position stored in the second subsection; and
processing the first set of pixel positions and the second set of pixel positions using the primitive parameter value referenced by both the copy of the first primitive pointer stored in the first subsection and the second copy of the first primitive pointer stored in the second subsection.

6. The method of claim 5, wherein a first portion of the first set of pixel positions and the second set of pixel positions are included within a first pixel tile of the primitive and a second portion of the first set of pixel positions and second set of pixel positions are included within a second pixel tile of the primitive.

7. A system for assembling pixel shader program threads for execution, comprising:
a streaming multithreaded controller comprising:
a first storage resource configured to store primitive pointers, wherein each primitive pointer stored in a storage buffer references a primitive parameter value corresponding to one of a plurality of primitives, and
a second storage resource configured to store a pixel shader program thread assembled by the streaming multithreaded controller, wherein the pixel shader program thread comprises at least one primitive pointer stored in the first storage resource and a plurality of pixel positions corresponding to at least one primitive, and wherein the pixel shader program thread further comprises an additional primitive parameter that is constant within a a first set of pixels associated with the pixel shader program thread; and
a multithreaded processing unit comprising:
a third storage resource configured to store a plurality of pixel shader program threads received from the second storage buffer,
a fourth storage resource configured to store primitive parameter values referenced by primitive pointers in pixel shader program threads stored in the third storage resource, and
a thread control unit configured to read pixel shader program threads from the third storage resource and the primitive parameter values from the fourth storage resource referenced by primitive pointers in the read pixel shader program threads and output positions of sets of pixels associated with pixel positions stored in the read pixel shader program threads and the primitive parameter values for processing according to a pixel shader program, wherein the pixel shader program thread in the second storage resource includes a coverage mask for a pixel set associated with one of the plurality of pixel positions in the pixel shader program thread and the thread control unit is configured to output the positions of sets of pixels associated with pixel positions stored in the read pixel shader program threads and the primitive parameter values for processing according to a pixel shader program for positions of the sets of pixel according to coverage masks in the pixel shader program thread, and wherein a first primitive parameter value stored in the fourth storage is referenced by a first copy of a primitive pointer included in a first slot of the third storage and a second copy of the primitive pointer included in a second slot of the third storage.

8. The system of claim 7, wherein the thread control unit is configured to replace a portion of the primitive parameter values with the additional primitive parameter.

9. The system of claim 7, wherein the streaming multithreaded controller is configured to assemble the pixel shader program thread in the second storage resource to include a first pixel position corresponding to a first pixel set in a first subsection of the pixel shader program thread and a second pixel position corresponding to a second pixel set in a second subsection of the pixel shader program thread if the first pixel set and the second pixel set are within a single pixel tile corresponding to the additional primitive parameter and to assemble the pixel shader program thread to include the first pixel position in the first subsection and to empty the second subsection if the first pixel set and the second pixel set are not within a single pixel tile.

10. The system of claim 9, wherein the additional primitive parameter is a plane equation coefficient for a depth component.

11. The system of claim 7, wherein the streaming multithreaded controller is configured to assemble the pixel shader program thread in the second storage resource to include a first pixel position corresponding to a first pixel set in a first subsection of the pixel shader program thread and a second pixel position corresponding to a second pixel set in a second subsection of the pixel shader program thread when the first pixel set and the second pixel set are within a single primitive and to assemble the pixel shader program thread to include the first pixel position in the first subsection and to empty the second subsection if the first pixel set and the second pixel set are not within a single primitive.

12. The system of claim 7, wherein the parameter values include plane equation coefficients for color components.

13. The method of claim 1, wherein the additional primitive parameter value that is stored in the first subsection is shared between the first subsection and the second subsection.

14. The method of claim 5, wherein the additional primitive parameter value that is stored in the first subsection is shared between the first subsection and the second subsection.

15. The system of claim 7, wherein the additional primitive parameter value is stored in the first slot and is shared between the first slot and the second slot.

* * * * *